United States Patent
Thirasuttakorn et al.

(10) Patent No.: US 9,344,865 B1
(45) Date of Patent: May 17, 2016

(54) METHODS FOR IMPROVING SERVICE OF SMPP MESSAGES AND DEVICES THEREOF

(71) Applicant: F5 Networks, Inc., Seattle, WA (US)

(72) Inventors: Nat Thirasuttakorn, Seattle, WA (US); Tao Liu, Issaquah, WA (US); David Hansen, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 14/199,523

(22) Filed: Mar. 6, 2014

Related U.S. Application Data

(60) Provisional application No. 61/774,182, filed on Mar. 7, 2013.

(51) Int. Cl.
*H04W 4/00* (2009.01)
*H04W 4/14* (2009.01)
*H04W 28/08* (2009.01)

(52) U.S. Cl.
CPC ............... *H04W 4/14* (2013.01); *H04W 28/08* (2013.01)

(58) Field of Classification Search
CPC ............................ H04W 4/14; H04W 28/08
See application file for complete search history.

(56) References Cited

U.S. PATENT DOCUMENTS

| | | | |
|---|---|---|---|
| 7,209,759 B1 | 4/2007 | Billing et al. | |
| 8,488,465 B2 | 7/2013 | Solis et al. | |
| 2005/0277430 A1* | 12/2005 | Meisl | H04L 12/5895 455/466 |
| 2013/0110939 A1 | 5/2013 | Yang et al. | |
| 2013/0120168 A1* | 5/2013 | Kumar | H03M 7/3059 341/90 |

* cited by examiner

*Primary Examiner* — Chuong A Ngo
(74) *Attorney, Agent, or Firm* — LeClairRyan, A Professional Corporation

(57) ABSTRACT

A method, non-transitory computer readable medium, and network traffic management apparatus that selects a first one of a plurality of Short Message Service Center (SMSC) servers based on a load balancing decision in response to an external short messaging entity (ESME) SMPP request message received from a first one of a plurality of ESMEs. A first sequence number is generated for the ESME SMPP request message. The first sequence number is stored in a first entry of a mapping table as associated with a sequence number included in the ESME SMPP request message and an indication of the first one of the plurality of SMSC servers. The sequence number included in the ESME SMPP request message is replaced with the first sequence number. The ESME SMPP request message is sent to the first one of the plurality of SMSC servers.

21 Claims, 6 Drawing Sheets

| Global Mapping Table 30 | | | | | | |
|---|---|---|---|---|---|---|
| Server | Last Sequence Number | | ESME Request | | | |
| | | | Original Sequence Number | Generated Sequence Number | Selected SMSC Server | Originating ESME |
| | | | | | | |
| ESME | Last Sequence Number | | SMSC Request | | | |
| | | | Original Sequence Number | Generated Sequence Number | Indicated ESME | Originating SMSC Server |
| | | | | | | |

METHODS FOR IMPROVING SERVICE OF SMPP MESSAGES AND DEVICES THEREOF

This application claims the benefit of U.S. Provisional Patent Application No. 61/774,182, filed on Mar. 7, 2013, which is hereby incorporated by reference in its entirety.

FIELD

This technology generally relates to methods and devices for improving service of Short Message Peer-to-Peer (SMPP) messages and, more particularly, to methods and devices for load balancing SMPP messages to Short Message Service Center (SMSC) servers while maintaining quality of service.

BACKGROUND

Many users of mobile computing devices, such as smart phones, having telecommunications capabilities that enable communications with other users of other such devices using Short Message Service (SMS) messages. The SMS messages are routed through a mobile telecommunications network to an External Short Messaging Entity (ESME) which is a gateway or proxy device configured to route the messages using a Short Message Peer-to-Peer (SMPP) protocol to a Short Message Service Center (SMSC). In response to the binding or other ESME request messages, the SMSC sends one or more reply messages to the requesting ESME such as a binding response message, receipt acknowledgement, delivery confirmation, validity confirmation, or other response message, for example. Similarly, messages can be initiated by an SMSC and reply message can be sent by the ESME in response.

Since all messages are sent asynchronously according to the SMPP protocol, in order to accurately route reply messages, the initiating or requesting ESME or SMSC includes a sequence number in each request message. The responding ESME or SMSC retrieves the sequence number and inserts it into any message(s) sent in reply to the ESME or SMSC request message. However, SMSC bandwidth is often unable to effectively service SMPP messages, particularly during periods of high volume, resulting in some SMPP messages (and associated SMS messages) being dropped or significantly delayed, which is undesirable.

SUMMARY

A method for improving service of Short Message Peer-to-Peer (SMPP) messages includes selecting, with a network traffic management apparatus, a first one of a plurality of Short Message Service Center (SMSC) servers based on a load balancing decision in response to an external short messaging entity (ESME) SMPP request message received from a first one of a plurality of ESMEs. A first sequence number is generated, with the network traffic management apparatus, for the ESME SMPP request message. The first sequence number is stored, with the network traffic management apparatus, in a first entry of a mapping table as associated with a sequence number included in the ESME SMPP request message and an indication of the first one of the plurality of SMSC servers. The sequence number included in the ESME SMPP request message is replaced, with the network traffic management apparatus, with the first sequence number. The ESME SMPP request message is sent, with the network traffic management apparatus, to the first one of the plurality of SMSC servers.

A non-transitory computer readable medium having stored thereon instructions for improving service of SMPP messages comprising machine executable code which when executed by a processor, causes the processor to perform steps including selecting a first one of a plurality of SMSC servers based on a load balancing decision in response to an ESME SMPP request message received from a first one of a plurality of ESMEs. A first sequence number is generated for the ESME SMPP request message. The first sequence number is stored in a first entry of a mapping table as associated with a sequence number included in the ESME SMPP request message and an indication of the first one of the plurality of SMSC servers. The sequence number included in the ESME SMPP request message is replaced with the first sequence number. The ESME SMPP request message is sent to the first one of the plurality of SMSC servers.

A network traffic management apparatus including at least one of configurable hardware logic configured to be capable of implementing or a processor or a communication interface coupled to a memory and configured to be capable of executing instructions stored in the memory including selecting a first one of a plurality of SMSC servers based on a load balancing decision in response to an ESME SMPP request message received from a first one of a plurality of ESMEs. A first sequence number is generated for the ESME SMPP request message. The first sequence number is stored in a first entry of a mapping table as associated with a sequence number included in the ESME SMPP request message and an indication of the first one of the plurality of SMSC servers. The sequence number included in the ESME SMPP request message is replaced with the first sequence number. The ESME SMPP request message is sent to the first one of the plurality of SMSC servers.

This technology provides a number of advantages including providing improved methods, non-transitory computer readable medium, and devices for servicing SMPP messages. With this technology, ESME SMPP request messages are load balanced to a plurality of SMSC servers thereby improving the average latency of associated SMPP messages. Advantageously, a mapping table is utilized to preserve sequence numbers of the ESME and SMSC request and reply messages, make the load balancing possible, improve quality of service, and reduce the number of messages that are dropped. Accordingly, the user experience is improved and SMPP messages can be delivered more quickly.

BRIEF DESCRIPTION OF THE DRAWINGS

FIG. 4 is an exemplary global mapping table for preserving sequence numbers used in ESME and SMSC messages;

DETAILED DESCRIPTION

Figure 1:
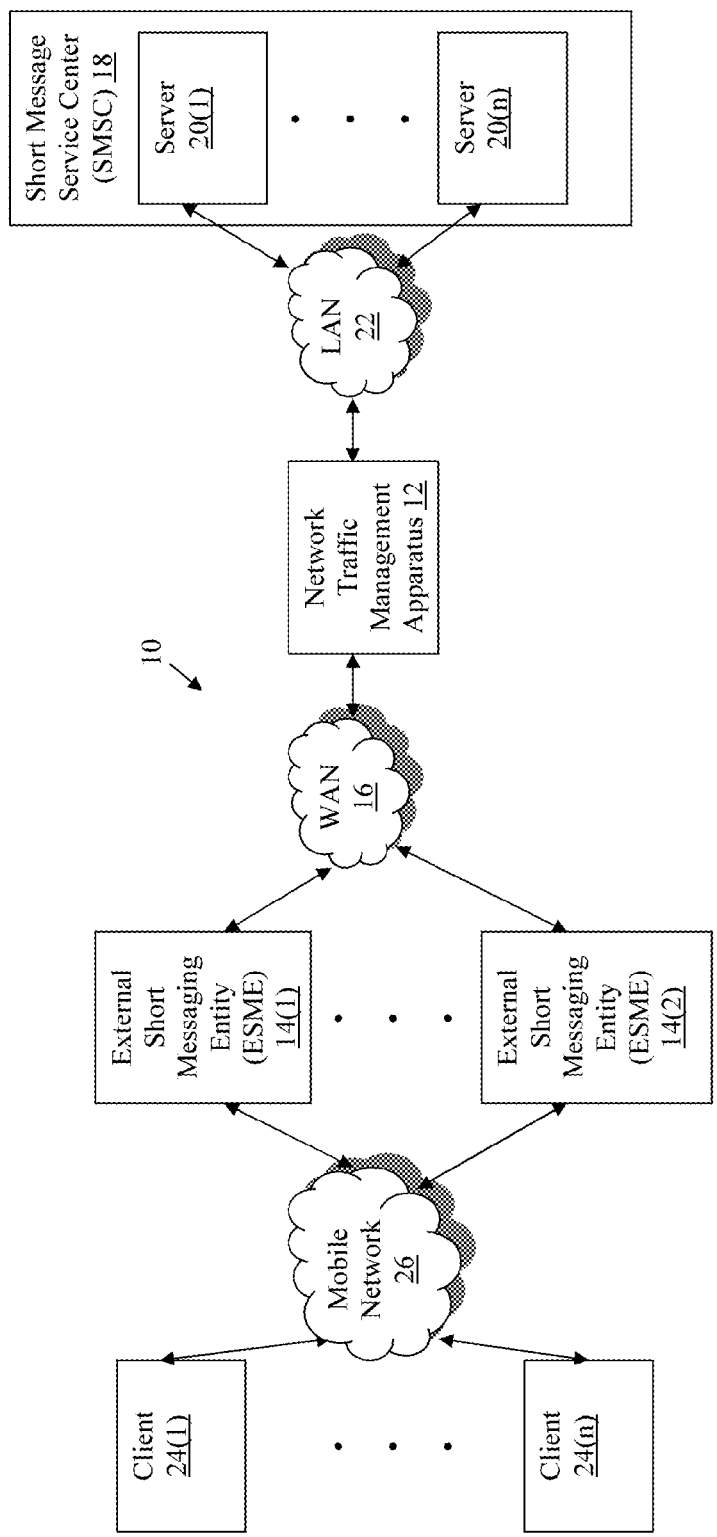
FIG. 1 a block diagram of a network environment with an exemplary network traffic management apparatus.

An exemplary network environment 10 for improving service of Short Message Peer-to-Peer (SMPP) messages including a network traffic management apparatus 12 coupled to a plurality of external short messaging entities (ESMEs) 14(1)-14(n) by a wide area network (WAN) 16, an Short Message Service Center (SMSC) 18, including a plurality of SMSC servers 20(1)-20(n), by a local area network (LAN) 22, and a plurality of clients 24(1)-24(n) by the WAN 16, one or more of the ESMEs 14(1)-14(n), and a mobile network 26, is illustrated in FIG. 1. The network traffic management apparatus 12, ESMEs 14(1)-14(n), SMSC 18, and clients 24(1)-24(n) may be coupled together via other topologies and the network environment 10 may include other network devices such as one or more routers and/or switches, for example. This technology provides a number of advantages including methods, non-transitory computer readable medium, and apparatuses that improve service of SMPP messages by load balancing ESME request messages across a plurality of SMSC servers.

Figure 2:
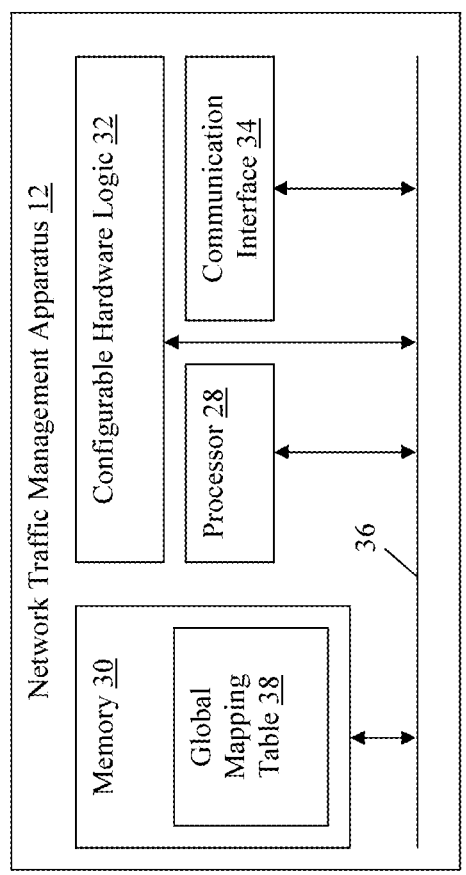
FIG. 2 is a block diagram of the exemplary network traffic management apparatus.

Referring to FIGS. 1-2, the network traffic management apparatus 12 may perform any number of functions, such as optimizing and load balancing the network traffic between the ESMEs 14(1)-14(n) and the SMSC servers 20(1)-20(n) by way of example only. The network traffic management apparatus 12 includes at a processor 28, a memory 30, optional configurable hardware logic 32, and a communications interface 34, which are coupled together by a bus 36, although the network traffic management apparatus 12 may include other types and numbers of elements in other configurations. In this example, the bus is a hyper-transport bus, although other bus types and links may be used, such as PCI.

The processor 28 of the network traffic management apparatus 12 may execute one or more programmed instructions for one or more aspects of this technology as described and illustrated by way of the examples herein including functions for managing SMPP messaging, although the processor 28 could execute other numbers and types of programmed instructions. The processor 28 of the network traffic management apparatus 12 may comprise one or more CPUs or general purpose processors with one or more processing cores, for example.

The memory 30 of the network traffic management apparatus 12 stores these programmed instructions for one or more aspects of the present technology as described and illustrated herein, although some or all of the programmed instructions could be stored and executed elsewhere. In this example, the memory 30 also stores a global mapping table 38 used to maintain accuracy of sequence numbers in order to implement load balancing across the SMSC servers, as described and illustrated in more detail later. In other examples, the memory 30 can store a plurality of mapping tables for each of the ESMEs 14(1)-14(n), also as described and illustrated in more detail later. A variety of different types of memory storage devices, such as a random access memory (RAM) or a read only memory (ROM) in the system or a floppy disk, hard disk, CD ROM, DVD ROM, or other computer readable medium which is read from and written to by a magnetic, optical, or other reading and writing system that is coupled to the processor, can be used for the memory 30.

The optional configurable hardware logic 32 of the network traffic management apparatus 12 may include specialized hardware configured to be capable of implementing one or more steps of this technology as illustrated and described with reference to the examples herein. By way of example only, the optional configurable hardware logic 32 may include one or more of field programmable gate arrays (FPGAs), field programmable logic devices (FPLDs), application specific integrated circuits (ASICs), and/or programmable logic units (PLUs).

The communications interface operatively couples and communicates between the network traffic management apparatus 12, the ESMEs 14(1)-14(n), and SMSC servers 20(1)-20(n), which are all coupled together by the LAN 22 and WAN 16, although other types and numbers of communication networks or systems with other types and numbers of connections and configurations to other devices and elements. By way of example only, the LAN 22 and WAN 16 can use TCP/IP over Ethernet, although other industry-standard protocols can also be used.

The LAN 22 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The WAN may comprise any wide area network (e.g., Internet), although any other type of traffic network topology may be used.

Each client 24(1)-24(n), each of the ESMEs 14(1)-14(n), and each of the SMSC servers 20(1)-20(n) includes a processor, a memory, and a communications interface, which are coupled together by a bus or other link, although other numbers and types of devices could be used. The clients 24(1)-24(n) may run applications that may provide an interface to generate and send SMS messages to one or more of the ESMEs 14(1)-14(n). The clients 24(1)-24(n) can be smartphones, tablets, netbooks, or any other device having mobile network connectivity.

The ESMEs 14(1)-14(n) are gateway devices configured to process and packetize the SMS message data into one or more ESME SMPP request messages which are routed over the WAN 16 to the network traffic management apparatus 12 using a respective long-lived TCP connection established between each of the ESMEs 14(1)-14(n) and the network traffic management apparatus 12 following a handshake process. The ESMEs 14(1)-14(n) also are configured to receive and respond to SMPP request messages sent from the SMSC 18 through the network traffic management apparatus 12 and a respective TCP connection. In this example, a plurality of ESMEs 14(1)14(n) is provided, although in some network environments only one ESME is utilized.

Generally, the SMSC servers 20(1)-20(n) process requests received from requesting ESMEs 14(1)-14(n) and generate requests sent to the ESMEs 14(1)-14(n) via the LAN 22, WAN 16, and network traffic management apparatus 12 according to the SMPP protocol. The SMSC servers 20(1)-20(n) can communicate with other networks and network devices in order to route SMS message data included in ESME SMPP request messages to the appropriate one of the clients 24(1)-24(n).

Although an exemplary network environment 10 with the network traffic management apparatus 12, ESMEs 14(1)-14(n), SMSC servers 20(1)-20(n), clients 24(1)-24(n), mobile network 26, WAN 16, and LAN 22 are described and illustrated herein, other types and numbers of systems, devices, components, and elements in other topologies can be used. It is to be understood that the systems of the examples described herein are for exemplary purposes, as many variations of the specific hardware and software used to implement the examples are possible, as will be appreciated by those skilled in the relevant art(s).

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic media, wireless traffic networks, cellular traffic networks, G3 traffic networks, Public Switched Telephone Network (PSTNs), Packet Data Networks (PDNs), the Internet, intranets, and combinations thereof.

The examples also may be embodied as a non-transitory computer readable medium having instructions stored thereon for one or more aspects of the present technology as described and illustrated by way of the examples described herein, which when executed by a processor, cause the processor to carry out the steps necessary to implement the methods of the examples, as described and illustrated herein.

Figure 3:
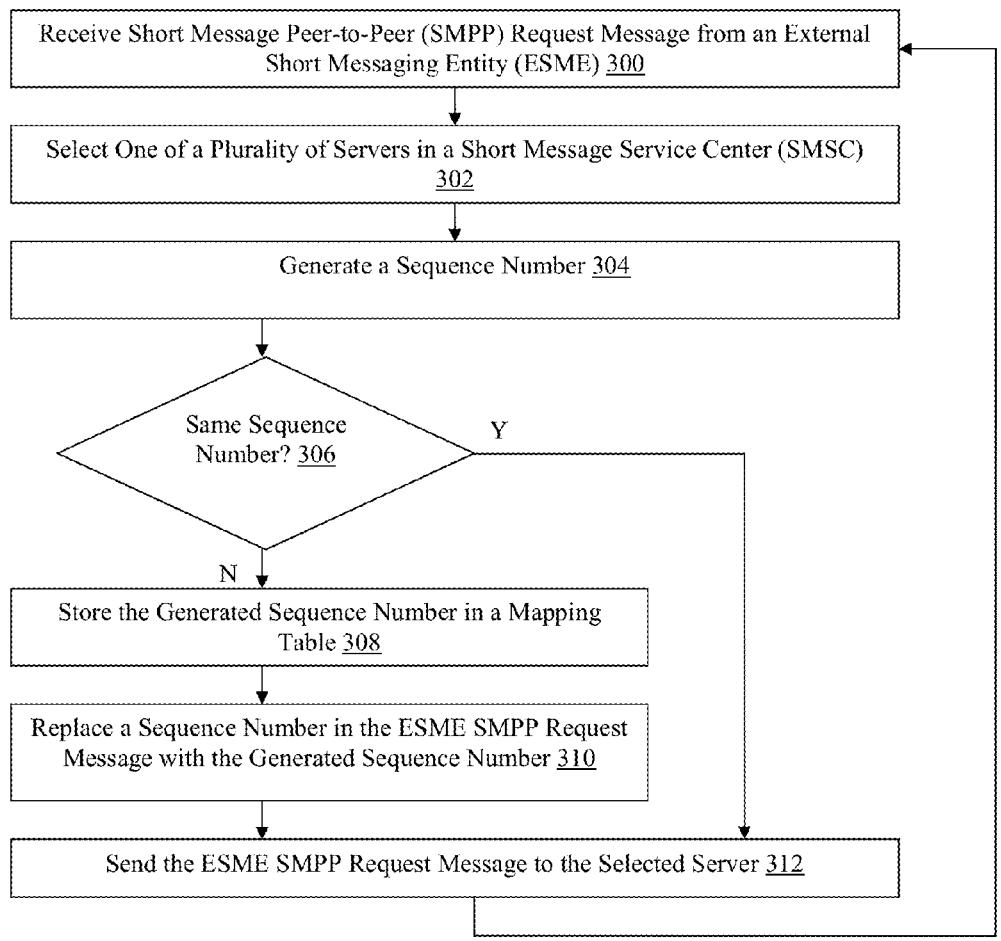
FIG. 3 is a flowchart of an exemplary method for processing an ESME SMPP request message.

An exemplary method for improving service of SMPP messages will now be described with reference to FIGS. 1-7. Referring more specifically to FIG. 3, an exemplary method for processing an ESME SMPP request message will now be described. In this example, in step 300, the network traffic management apparatus 12 receives an SMPP request message including a sequence number from one of the ESMEs 14(1)-14(n). Exemplary ESME SMPP request messages include bind transmitter and submit_sm, although any other SMPP request messages can also be received from the one of the ESMEs 14(1)-14(n). The received SMPP ESME request message can be generated by the one of the ESMEs 14(1)-14(n) in response to receipt of a request to send an SMS message from one of the clients 24(1)-24(n) over the mobile network 26, for example. Additionally, the network traffic management apparatus 12 can receive the ESME SMPP request message using a previously established long-lived TCP connection with the one of the ESMEs 14(1)-14(n), although the ESME SMPP request message can be received via other types of connections and methods.

In step 302, the network traffic management apparatus 12 selects one of the plurality of SMSC servers 20(1)-20(n) based on a load balancing decision, although the selection could be based on other types and numbers of decisions or other factors. The load balancing decision can be content-based, based on characteristic(s) of the ESME SMPP request message and/or based on characteristic(s) of one or more of the SMSC servers 20(1)-20(n). For example, the load balancing decision can be based on a recipient address included in the payload of the ESME SMPP request message or the utilization level of each of the SMSC servers 20(1)-20(n), although any other characteristic(s) can be used. By routing the ESME SMPP request message based on a load balancing decision, otherwise underutilized SMSC servers 20(1)-20(n) can handle an increased share of the SMPP traffic. In periods of high volume, load balancing ESME SMPP request messages can improve the service (e.g. response time or drop rate) of the ESMP SMPP request messages and associated SMS messages.

In step 304, the network traffic management apparatus 12 generates a sequence number for the ESME SMPP request message. While not strictly required by the SMPP protocol, many SMSC servers 20(1)-20(n) will reject a received ESME SMPP request message when the sequence number in the received messages is not greater than, or greater by one than, the last received ESME SMPP request message. While, according to the SMPP protocol, the sequence number included in the ESME SMPP request message received in step 300 will be greater by one than the last received ESME SMPP request message, the last received ESME SMPP request message may not have been load balanced to the one of the SMSC servers 20(1)-20(n) selected in step 302.

Additionally, in examples including a plurality of ESMEs 14(1)-14(n) and a global mapping table 30, an ESME SMPP request message with a lower sequence number could be load balanced to the one of the SMSC servers 20(1)-20(n) selected in step 302 subsequent to an ESME SMPP request message with a higher sequence number sent from a different one of the ESMEs 14(1)-14(n). This may cause the selected one of the SMSC servers 20(1)-20(n) to reject or drop the subsequent ESME SMPP request message.

In some examples, the network traffic management apparatus 12 stores the last sequence number sent to each of the SMSC servers 20(1)-20(n) in an ESME SMPP request message, such as in the memory 30. In these examples, the network traffic management apparatus 12 can generate the sequence number by selecting a number greater than the stored sequence number associated with the selected one of the SMSC servers 20(1)-20(n), such as by incrementing the stored sequence number by one, for example. The stored sequence number can be updated whenever a new sequence number is generated in step 304.

Optionally, in examples in which only one ESME or a local mapping table associated with each TCP connection to one of the ESMEs 14(1)-14(n) is used, in step 306, the network traffic management apparatus 12 determines whether the sequence number generated in step 302 for the ESME SMPP request message matches the sequence number included in the ESME SMPP request message. If the network traffic management apparatus 12 determines the sequence number generated in step 302 for the ESME SMPP request message does not match the sequence number included in the ESME SMPP request message, then the No branch is taken to step 308.

In step 308, the network traffic management apparatus 12 stores the generated sequence number in the global mapping table 30 (or the local mapping table). Referring more specifically to FIG. 4, an exemplary global mapping table 30 for preserving sequence numbers used in ESME and SMSC messages is illustrated. In this example, the global mapping table 30 optionally is used to store the last sequence number sent to each of the SMSC servers 20(1)-20(n) in an ESME SMPP request message, although separate tables can also be used. In this example, the network traffic management apparatus 12 stores the sequence number generated for the ESME SMPP request message in an entry of the global mapping table 30 as associated with the original sequence number included in the ESME SMPP request message.

Additionally, the network traffic management apparatus 12 stores an indication of the selected one of the SMSC servers 20(1)-20(n) and the one of the ESMEs 14(1)-14(n) that originated the ESME SMPP request message in the entry of the global mapping table 30. In examples in which a local mapping table is used for each of the ESMEs 14(1)-14(n) or only one ESME in the network environment 10, the network traffic management apparatus 12 does not store an indication of the one of the ESMEs 14(1)-14(n) that originated the ESME SMPP request message in the entry of the local mapping table.

In step 310, the network traffic management apparatus 12 replaces the sequence number included in the ESME SMPP request message with the sequence number generated in step 304. By storing the original sequence number included in the ESME SMPP request message as associated with the new generated sequence number, an indication of the selected one of the SMSC servers 20(1)-20(n), and an indication of the one of the ESMEs 14(1)-14(n) that originated the ESME SMPP request message in step 308, the original sequence number can be preserved and subsequently retrieved and utilized as described and illustrated later.

In step 312, the network traffic management apparatus 12 sends the ESME SMPP request message to the selected one of the SMSC servers 20(1)-20(n). Because the sequence number was generated in step 304 based on a sequence number in the last ESME SMPP request message sent to the selected one of the SMSC servers 20(1)-20(n), the one of the SMSC servers 20(1)-20(n) will not reject the ESME SMPP message due to an unexpected sequence number. The ESME SMPP request message can be sent to the selected one of the SMSC servers 20(1)-20(n) using a long-lived TCP connection previously established with the selected one of the SMSC servers 20(1)-20(n), for example, although other methods of sending the ESME SMPP request message can also be used. The selected one of the SMSC servers 20(1)-20(n) then processes the ESME SMPP request message according to the message type and/or payload, for example, which may require communicating the contents of the ESME SMPP request message to another network and/or sending an SMSC SMPP reply message, as described and illustrated later, for example.

Accordingly, in this example, the order of sequence numbers sent in ESME SMPP request message will be maintained by the network traffic management apparatus 12 for the TCP connection with the selected one of the SMSC servers 20(1)-20(n). After sending the ESME SMPP request message, or during any of the previous steps, the network traffic management apparatus 12 can receive another ESME SMPP request message from the one of the ESMEs 14(1)-14(n), or a different one of the ESMEs 14(1)-14(n), in step 300.

Referring back to step 306, if the network traffic management apparatus 12 determines the sequence number generated in step 304 for the ESME SMPP request message does match the sequence number included in the ESME SMPP request message, then the Yes branch is taken to step 312. In step 312, the ESME SMPP request message is sent to the selected one of the SMSC servers 20(1)-20(n), as described and illustrated earlier. As indicated earlier, step 306 is optional and only performed in examples in which only one ESME is used or a different local mapping table is used for each TCP connection with one of the ESMEs 14(1)-14(n).

In these examples, the sequence number will not need to be replaced when the original sequence number is the same as the generated sequence number. Also, since there is only one ESME in the environment, or only one ESME associated with the local mapping table, there will also never be two entries in the local mapping table having the same generated sequence number. Accordingly, in these examples, an entry does not need to be stored in the local mapping table when the generated sequence number matches the original sequence number included in the ESME SMPP request message.

Figure 5:
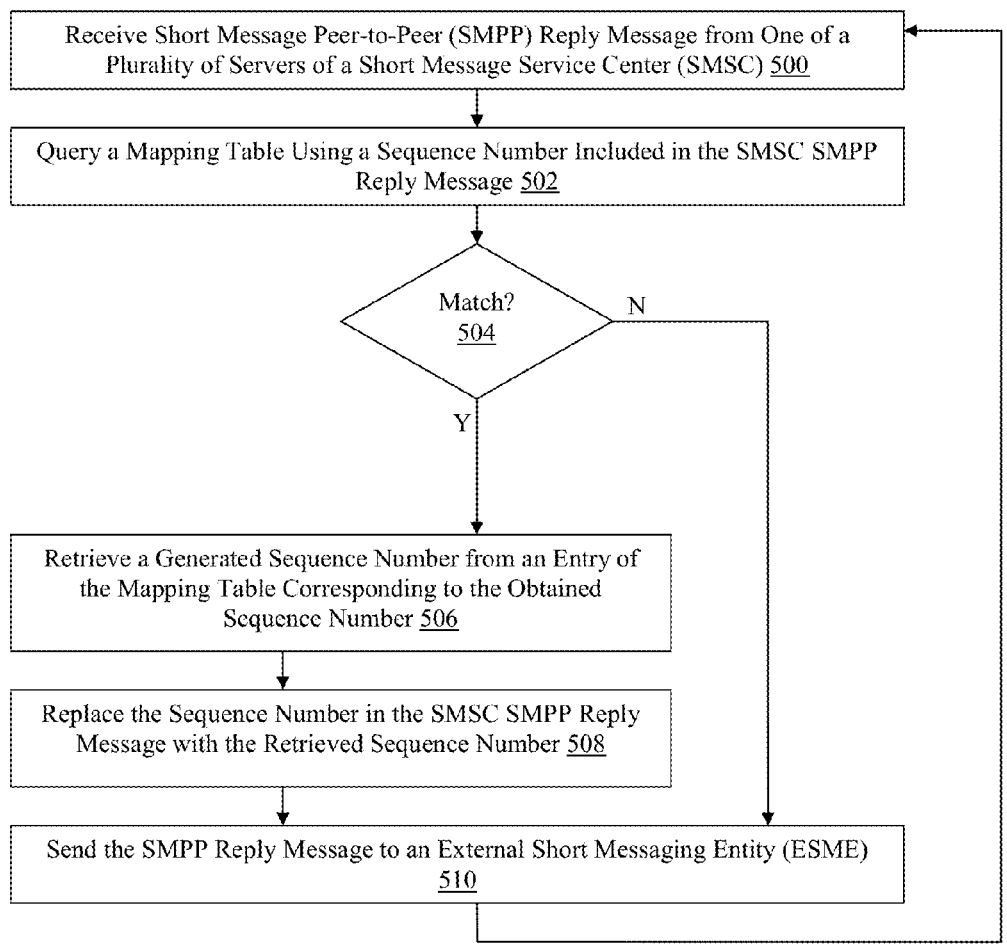
FIG. 5 is a flowchart of an exemplary method for processing an SMSC SMPP reply message.

Referring to FIG. 5, an exemplary method for processing an SMSC SMPP reply message will now be described. In this example, in step 500, the network traffic management apparatus 12 receives an SMPP reply message from one of the SMSC servers 20(1)-20(n). The SMSC SMPP reply message can be generated and sent by the one of the SMSC servers 20(1)-20(n) selected in step 302 of FIG. 3, in response to the ESME SMPP request message sent on behalf of the one ESME in step 308 of FIG. 3, or by another one of the SMSC servers 20(1)-20(n) in response to an ESME SMPP request message sent from the one of the ESMEs 14(1)-14(n) or another one of the ESMEs 14(1)-14(n).

In step 502, the network traffic management apparatus 12 queries the global mapping table 30 using a sequence number included in the received SMSC SMPP reply message and an indication of the one of the SMSC servers 20(1)-20(n) from which the SMSC SMPP reply message was sent. According to the SMPP protocol, the one of the SMSC servers 20(1)-20(n) will include, in the SMSC SMPP reply message, the sequence number of the ESME SMPP request message to which the SMSC SMPP reply message is responsive. The sequence number of the ESME SMPP request message to which the SMSC SMPP reply message is responsive will be a sequence number previously generated as described and illustrated earlier with reference to step 304 of FIG. 3.

However, the network traffic management apparatus 12 could have generated the same sequence number in step 304 of FIG. 3 for different ESME SMPP request messages that were load balanced to two or more different of the SMSC servers 20(1)-20(n) in step 312 of FIG. 3. Accordingly, the sequence number included in the SMSC SMPP reply message, by itself, is not a key for the entries of the global mapping table 30 and an indication of the one of the SMSC servers 20(1)-20(n) originating the SMSC SMPP reply message must also be used to retrieve the original sequence number.

Optionally, in examples in which only one ESME or a local mapping table associated with each TCP connection to one of the ESMEs is used, in step 504, the network traffic management apparatus 12 determines whether the sequence number included in the SMSC SMPP reply message and used to query the local mapping table matches a previously generated sequence number included in an entry of the local mapping table. In these examples, it is possible that the sequence number generated in step 304 of FIG. 3 is the same sequence number as included in an ESME SMPP request message, as determined in step 306 of FIG. 3, and an entry is not therefore stored in the local mapping table in the step 308 of FIG. 3. Accordingly, if the network traffic management apparatus 12 determines the sequence number included in the ESME SMPP reply message matches a previously generated sequence number included in an entry of the local mapping table, then the Yes branch is taken to step 506.

In step 506, the network traffic management apparatus 12 retrieves a stored original sequence number from an entry in the global mapping table 30. The entry corresponds to a sequence number included in the SMSC SMPP reply message and an indication of the one of the SMSC servers 20(1)-20(n) from which the network traffic management apparatus 12 received the SMSC SMPP reply message. According to the SMPP protocol, the one of the SMSC servers 20(1)-20(n) will include, in the SMSC SMPP reply message, the sequence number of the ESME SMPP request message to which the SMSC SMPP reply message is responsive.

In step 508, the network traffic management apparatus 12 replaces the sequence number included in the SMSC SMPP reply message with the original sequence number retrieved in step 502. Since the sequence number included in the SMSC SMPP reply message was previously generated by the network traffic management apparatus 12, it must be written back to the original sequence number used by the one of the ESMEs 14(1)-14(n) indicated in the SMSC SMPP reply message. The sequence number is written back so that the SMSC SMPP reply message is appropriately processed by the one of the ESMEs 14(1)-14(n) that originated the ESME SMPP request message to which the SMSC SMPP reply message is responsive.

In step 510, the network traffic management apparatus 12 sends the SMSC SMPP reply message to the one of the ESMEs 14(1)-14(n) indicated in the entry in the global mapping table 30 from which the stored original sequence number was retrieved in step 502. In examples in which a local mapping table is stored for each of the ESMEs **14(1)-14(*n*) or only one ESME is provided in the network environment, the network traffic management apparatus 12** sends the SMSC SMPP reply message to the ESME associated with the local mapping table or the one ESME provided in the network environment.

The one of the ESMEs **14(1)-14(*n*) then processes the SMSC SMPP reply message according to the message type and/or payload, for example, which may require communicating with one of the clients 24(1)-24(*n*) using the mobile network 26 or initiating another ESME SMPP request message, as described and illustrated earlier, for example. After sending the SMSC SMPP reply message, or during any of the previous steps, the network traffic management apparatus 12 can receive another SMSC SMPP reply message from the one of the SMSC servers 20(1)-20(*n*) or a different one of the SMSC servers 20(1)-20(*n*) in step 500**.

Referring back to step 504, if the network traffic management apparatus 12 determines the sequence number included in the SMSC SMPP reply message does not match a previously generated sequence number included in an entry of the global mapping table 30, then the No branch is taken to step 510. In step 510, the SMSC SMPP reply message is sent to the one ESME in the network environment, or the one of the ESMEs **14(1)-14(*n*) associated with the local mapping table, as described and illustrated earlier. As indicated earlier, step 504 is optional and only performed in examples in which only one ESME is used or a different local mapping table is used for each TCP connection with one of the ESMEs 14(1)-14(*n*). In these examples, the sequence number generated in step 302 of FIG. 3** was the same as the original sequence number included in the ESME SMPP request message. Accordingly an entry was not stored in the local mapping table, as described and illustrated earlier.

Figure 6:
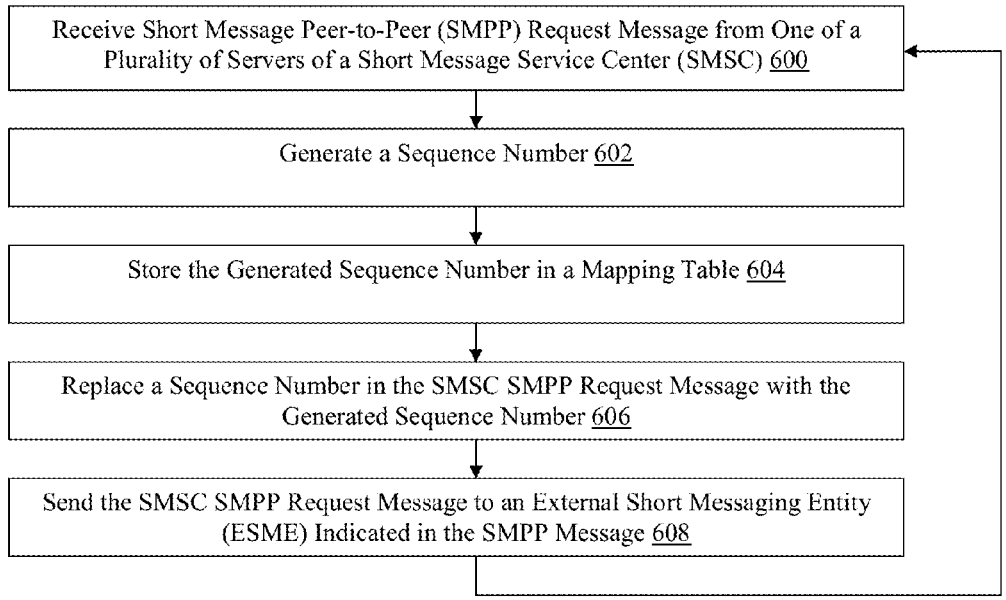
FIG. 6 is a flowchart of an exemplary method for processing an SMSC SMPP request message.

Referring to FIG. 6, an exemplary method for processing an SMSC SMPP request message will now be described. In this example, in step 600, the network traffic management apparatus 12 receives an SMSC SMPP request message from one of the SMSC servers **20(1)-20(*n*). The SMSC SMPP request message can be a deliver sm or data sm, for example, although the message can be any SMPP request message originated by the one of the SMSC servers 20(1)-20(*n*)**.

In step 602, the network traffic management apparatus 12 generates a sequence number for the SMSC SMPP request message. As is the case with the SMSC servers **20(1)-20(*n*), as described earlier, the ESMEs 14(1)-14(*n*) may also reject or drop SMSC SMPP reply messages that do not follow an increasing sequence number order. While the sequence numbers used by each respective one of the SMSC servers 20(1)-20(*n*) in SMSC SMPP request messages will be increasing, an SMSC SMPP request message having a higher sequence number could be sent to one of the ESMEs 14(1)-14(*n*) from one of the SMSC servers 20(1)-20(*n*) before an SMSC SMPP request message having a lower sequence number is sent to the one of the ESMEs 14(1)-14(*n*) from a different one of the SMSC servers 20(1)-20(*n*)**.

In some examples, the network traffic management 12 stores the last sequence number sent to each of the ESMEs **14(1)-14(*n*) in a SMSC SMPP request message, such as in the global mapping table 30 for example, although the last sequence number sent to each of the ESMEs 14(1)-14(*n*) can be stored elsewhere. In these examples, the network traffic management apparatus 12 can generate the sequence number by selecting a number greater than the stored sequence number associated with the one of the ESMEs 14(1)-14(*n*)** indicated in the SMSC SMPP request message, such as by incrementing the stored sequence number by one, for example. The stored sequence number can be updated whenever a new sequence number is generated in the second step.

In step 604, the network traffic management apparatus 12 stores the sequence number generated in step 602 in the global mapping table 30. In this example, the network traffic management apparatus 12 stores the sequence number generated for the SMSC SMPP request in an entry of the global mapping table 30 as associated with the original sequence number included in the SMSC SMPP request message and an indication of the one of the SMSC servers **20(1)-20(*n*) that originated the SMSC SMPP request message. In examples in which a plurality of ESMEs 14(1)-14(*n*) and a global mapping table 30 is used, the network traffic management apparatus 12 also stores an indication of one of the ESMEs 14(1)-14(*n*) indicated in the SMSC request message as associated with the sequence number generated for the SMSC SMPP request message, the original sequence number included in the SMSC SMPP request message, and the indication of the one of the SMSC servers 20(1)-20(*n*)** that originated the SMSC SMPP request message.

In step 606, the network traffic management apparatus 12 replaces the original sequence number included in the SMSC SMPP request message with the sequence number generated in step 602 for the SMSC SMPP request message. By storing the original sequence number included in the SMSC SMPP request message as associated with the new generated sequence number, the indication of the one of the SMSC servers **20(1)-20(*n*) that originated the SMSC SMPP request message, and, optionally, an indication of the one of the ESMEs 14(1)-14(*n*) in step 604**, the original sequence number can be preserved and subsequently retrieved and utilized as described and illustrated later.

In step 608, the network traffic management apparatus 12 sends the SMSC SMPP request message to the one of the ESMEs **14(1)-14(*n*) indicated in the SMSC SMPP request message. Because the sequence number was generated in step 602 based on a sequence number in the last SMSC SMPP request message sent to the one of the ESMEs 14(1)-14(*n*), the one of the ESMEs 14(1)-14(*n*) will not reject the SMSC SMPP message due to an unexpected sequence number. The SMSC SMPP request message can be sent to the one of the EMSEs 14(1)-14(*n*) using a long-lived TCP connection previously established with the one of the ESMEs 14(1)-14(*n*), for example, although the SMSC SMPP request message can be sent via other types of connection or other methods. The one of the ESMEs 14(1)-14(*n*) then processes the SMSC SMPP request message according to the message type and/or payload, for example, which may require communicating with one of the clients 24(1)-24(*n*) using the mobile network 26** and/or sending an ESME SMPP reply message, as described and illustrated later, for example.

Accordingly, in this example, the order of sequence numbers sent in SMSC SMPP request message will be maintained by the network traffic management apparatus 12 for the TCP connection with the one of the ESMEs **14(1)-14(*n*). After sending the SMSC SMPP request message, or during any of the previous steps, the network traffic management apparatus 12 can receive another SMSC SMPP request message from the one of the SMSC servers 20(1)-20(*n*) or a different one of the SMSC servers 20(1)-20(*n*) in step 600**.

Figure 7:
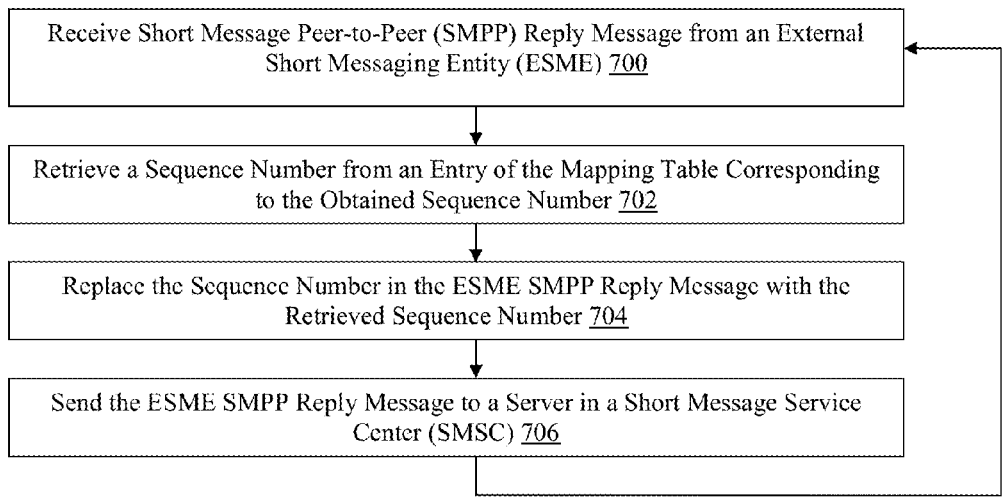
FIG. 7 is a flowchart of an exemplary method for processing an ESME SMPP reply message.

Referring to FIG. 7, an exemplary method for processing an ESME SMPP reply message will now be described. In this example, in step 700, the network traffic management apparatus 12 receives an ESME reply message from one of the ESMEs **14(1)-14(*n*). The ESME SMPP reply message can be generated and sent by the one of the ESMEs 14(1)-14(*n*) in response to the SMSC SMPP request message sent in step 608** of FIG. 6, by the one of the ESMEs 14(1)-14(*n*) in response to a different SMSC SMPP request message sent by the same or a different one of the SMSC servers 20(1)-20(*n*), or by a different one of the ESMEs 14(1)-14(*n*).

In step 702, the network traffic management apparatus 12 retrieves an original sequence number from an entry of the global mapping table 30. The entry corresponds to a sequence number included in the ESME SMPP reply message and an indication of the one of the ESMEs 14(1)-14(*n*) from which the network traffic management apparatus 12 received the ESME SMPP reply message. In examples in which a plurality of ESMEs 14(1)-14(*n*) and a global mapping table 30 are used, there will always be an entry of the global mapping table 30 having a sequence number matching the sequence number included in the ESME SMPP reply message received in step 700.

In step 704, the network traffic management apparatus 12 replaces the sequence number included in the ESME SMPP reply message with the original sequence number retrieved in step 702. Since the sequence number included in the ESME SMPP reply message was previously generated by the network traffic management apparatus 12, it must be written back to the original sequence number used by one of the SMSC servers 20(1)-20(*n*) indicated in the ESME SMPP reply message. The sequence number is written back so that the ESME SMPP reply message is appropriately processed by the SMSC server 20(1)-20(*n*) that originated the SMSC SMPP request message to which the ESME SMPP reply message is responsive.

In step 706, the network traffic management apparatus 12 sends the ESME SMPP reply message to one of the SMSC servers 20(1)-20(*n*) indicated in the entry of the global mapping table 30 from which the original sequence number was retrieved in step 702. The one of the SMSC servers 20(1)-20(*n*) then processes the ESME SMPP reply message according to the message type and/or payload, for example, which may require communicating the contents of the ESME reply message to another network and/or initiating another SMSC SMPP request message, as described and illustrated earlier, for example. After sending the ESME SMPP reply message, or during any of the previous steps, the network traffic management apparatus 12 can receive another ESME SMPP reply message from the one of the ESMEs 14(1)-14(*n*) or a different one of the ESMEs 14(1)-14(*n*) in step 700.

Accordingly, as illustrated and described herein this technology provides a number of advantages including methods, non-transitory computer readable medium, and network traffic management apparatuses that load balance ESME SMPP request messages to a plurality of SMSC servers. With this technology, a mapping table is utilized to preserve sequence numbers so that the messages are appropriately processed. By load balancing ESME SMPP request messages across a plurality of SMSC servers, service of the SMPP, messages and associated SMS messages, is improved for the users of client devices originating and receiving the SMS messages.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for improving service of Short Message Peer-to-Peer (SMPP) messages, executable by one or more network traffic management apparatus with at least one processor executing the method, the method comprising steps to:
    selected, by a first processor on the one or more network traffic management apparatus, a first one of a plurality of Short Message Service Center (SMSC) servers based on a load balancing decision in response to an external short messaging entity (ESME) SMPP request message received from a first one of a plurality of ESMEs;
    generate, by a second processor on the one or more network traffic management apparatus, a first sequence number for the ESME SMPP request message;
    store, by a third processor on the one or more network traffic management apparatus, the first sequence number in a first entry of a mapping table as associated with a second sequence number included in the ESME SMPP request message and an indication of the selected first one of the plurality of SMSC servers;
    modify, by a fourth processor on the one or more network traffic management apparatus, the ESME SMPP request message by replacing the second sequence number included in the ESME SMPP request message with the first sequence number; and
    send, by a fifth processor on the one or more network traffic management apparatus, the modified ESME SMPP request message to the selected first one of the plurality of SMSC servers.

2. The method as set forth in claim 1, wherein the first sequence number is greater than a last generated sequence number associated with a Transmission Control Protocol (TCP) connection with the first one of the plurality of SMSC servers or a next sequential sequence number following the last generated sequence number associated with the TCP connection with the first one of the plurality of SMSC servers.

3. The method as set forth in claim 1, further comprising employing at least one of the first, second, third, fourth, or fifth processors on the one or more network traffic management apparatus to:
    receive a SMSC SMPP reply message from the first one of the plurality of SMSC servers in response to the ESME SMPP request message;
    receive the second sequence number from the first entry in the mapping table;
    replace the first sequence number included in the SMSC SMPP reply message with the retrieved second sequence number; and
    send the SMSC SMPP reply message to the first one of the plurality of ESMEs.

4. The method as set forth in claim 1, further comprising employing at least one of the first, second, third, fourth, or fifth processors on the one or more network traffic management apparatus to:
    receive a SMSC SMPP request message from a second one of the plurality of SMSC servers;
    generate a third sequence number for the SMSC SMPP request message;
    store the third sequence number in a second entry of the mapping table as associated with a fourth sequence number included in the SMSC SMPP request message and an indication of the second one of the plurality of SMSC servers;

replace the fourth sequence number included in the SMSC SMPP request message with the third sequence number; and send the SMSC SMPP request message to a second one of the plurality of ESMEs indicated in the SMSC SMPP request message.

5. The method as set forth in claim 4, further comprising employing at least one of the first, second, third, fourth, or fifth processors on the one or more network traffic management apparatus to store in the second entry of the mapping table an indication of the second one of a plurality of ESMEs included in the SMSC request message as associated with the third sequence number generated for the SMSC SMPP request message, the fourth sequence number included in the SMSC SMPP request message, and the indication of the second one of the plurality of SMSC servers.

6. The method as set forth in claim 4, wherein the second entry in the mapping table further corresponds to an indication of the second one of a plurality of ESMEs and the method further comprises employing at least one of the first, second, third, fourth, or fifth processors on the one or more network traffic management apparatus to:

an receive ESME SMPP reply message from the second one of the plurality of ESMEs in response to the SMSC SMPP request message;

receive the fourth sequence number and an indication of the second one of the plurality of SMSC servers from the second entry in the mapping table;

replace the third sequence number included in the ESME SMPP reply message with the fourth sequence number; and send the ESME SMPP reply message to the second one of the plurality of SMSC servers.

7. The method as set forth in claim 1, wherein the first processor, the second processor, the third processor, the fourth processor, and the fifth processor are the same processor.

8. The method as set forth in claim 1, wherein two or more of the first processor, the second processor, the third processor, the fourth processor, or the fifth processor are on a same one of the network traffic management apparatus.

9. A non-transitory computer readable medium having stored thereon instructions for improving service of Short Message Peer-to-Peer (SMPP) messages comprising executable code which when executed by one or more processor, causes the processors to perform steps comprising:

selecting a first one of a plurality of Short Message Service Center (SMSC) servers based on a load balancing decision in response to an external short messaging entity (ESME) SMPP request message received from a first one of a plurality of ESMEs;

generating a first sequence number for the ESME SMPP request message;

storing the first sequence number in a first entry of a mapping table as associated with a sequence number included in the ESME SMPP request message and an indication of the selected first one of the plurality of SMSC servers;

modifying the ESME SMPP request message by replacing the sequence number included in the ESME SMPP request message with the first sequence number; and sending the modified ESME SMPP request message to the selected first one of the plurality of SMSC servers.

10. The medium as set forth in claim 9, wherein the first sequence number is greater than a last generated sequence number associated with a Transmission Control Protocol (TCP) connection with the first one of the plurality of SMSC servers or a next sequential number following the last generated sequence number associated with the TCP connection with the first one of the plurality of SMSC servers.

11. The medium as set forth in claim 9, further having stored thereon instructions that when executed by the processors cause the processors to perform one or more additional steps comprising:

receiving a SMSC SMPP reply message from the first one of the plurality of SMSC servers in response to the ESME SMPP request message;

retrieving the second sequence number from the first entry in the mapping table;

replacing the first sequence number included in the SMSC SMPP reply message with the retrieved second sequence number; and sending the SMSC SMPP reply message to the first one of the plurality of ESMEs.

12. The medium as set forth in claim 9, further having stored thereon instructions that when executed by the processors cause the processors to perform one or more additional steps comprising:

receiving a SMSC SMPP request message from a second one of the plurality of SMSC servers;

generating a third sequence number for the SMSC SMPP request message;

storing the third sequence number in a second entry of the mapping table as associated with a fourth sequence number included in the SMSC SMPP request message and an indication of the second one of the plurality of SMSC servers;

replacing the fourth sequence number included in the SMSC SMPP request message with the third sequence number; and sending the SMSC SMPP request message to a second one of the plurality of ESMEs indicated in the SMSC SMPP request message.

13. The medium as set forth in claim 12, further having stored thereon instructions that when executed by the processors cause the processors to perform one or more additional steps comprising storing in the second entry of the mapping table an indication of the second one of a plurality of ESMEs included in the SMSC request message as associated with the third sequence number generated for the SMSC SMPP request message, the fourth sequence number included in the SMSC SMPP request message, and the indication of the second one of the plurality of SMSC servers.

14. The medium as set forth in claim 12, wherein the second entry in the mapping table further corresponding to an indication of the second one of a plurality of ESMEs, the medium further having stored thereon instructions that when executed by the processors cause the processors to perform one or more additional steps comprising:

receiving an ESME SMPP reply message from the second one of the plurality of ESMEs in response to the SMSC SMPP request message;

retrieving the fourth sequence number and an indication of the second one of the plurality of SMSC servers from the second entry in the mapping table;

replacing the third sequence number included in the ESME SMPP reply message with the fourth sequence number; and sending the ESME SMPP reply message to the second one of the plurality of SMSC servers.

15. One or more network traffic management apparatus, comprising:

memory comprising programmed instructions stored in the memory; and one or more processors configured to be capable of executing the programmed instructions stored in the memory to:
- select a first one of a plurality of Short Message Service Center (SMSC) servers based on a load balancing decision in response to an external short messaging entity (ESME) SMPP request message received from a first one of a plurality of ESMEs;
- generate a first sequence number for the ESME SMPP request message;
- store the first sequence number in a first entry of a mapping table as associated with a sequence number included in the ESME SMPP request message and an indication of the selected first one of the plurality of SMSC servers;
- modify the ESME SMPP request message by replacing the sequence number included in the ESME SMPP request message with the first sequence number; and
- send the modified ESME SMPP request message to the selected first one of the plurality of SMSC servers.

16. The apparatus as set forth in claim 15, wherein the first sequence number is greater than a last generated sequence number associated with a Transmission Control Protocol (TCP) connection with the first one of the plurality of SMSC servers or a next sequential number following the last generated sequence number associated with the TCP connection with the first one of the plurality of SMSC servers.

17. The apparatus as set forth in claim 15, the one or more processor are further configured to be capable of executing the programmed instructions stored in the memory to:
- receive a SMSC SMPP reply message from the first one of the plurality of SMSC servers in response to the ESME SMPP request message;
- retrieve the second sequence number from the first entry in the mapping table;
- replace the first sequence number included in the SMSC SMPP reply message with the retrieved second sequence number; and
- send the SMSC SMPP reply message to the first one of the plurality of ESMEs.

18. The apparatus as set forth in claim 15, the one or more processor are further configured to be capable of executing the programmed instructions stored in the memory to:
- receive a SMSC SMPP request message from a second one of the plurality of SMSC servers;
- generate a third sequence number for the SMSC SMPP request message;
- store the third sequence number in a second entry of the mapping table as associated with a fourth sequence number included in the SMSC SMPP request message and an indication of the second one of the plurality of SMSC servers;
- replace the fourth sequence number included in the SMSC SMPP request message with the third sequence number; and
- send the SMSC SMPP request message to a second one of the plurality of ESMEs indicated in the SMSC SMPP request message.

19. The apparatus as set forth in claim 18, wherein the one or more processor are further configured to be capable of executing the programmed instructions stored in the memory to store in the second entry of the mapping table an indication of the second one of a plurality of ESMEs included in the SMSC request message as associated with the third sequence number generated for the SMSC SMPP request message, the fourth sequence number included in the SMSC SMPP request message, and the indication of the second one of the plurality of SMSC servers.

20. The apparatus as set forth in claim 18, wherein the second entry in the mapping table further corresponding to an indication of the second one of a plurality of ESMEs and the one or more processor are further configured to be capable of executing the programmed instructions stored in the memory to:
- receive an ESME SMPP reply message from the second one of the plurality of ESMEs in response to the SMSC SMPP request message;
- retrieve the fourth sequence number and an indication of the second one of the plurality of SMSC servers from the second entry in the mapping table;
- replace the third sequence number included in the ESME SMPP reply message with the fourth sequence number; and
- send the ESME SMPP reply message to the second one of the plurality of SMSC servers.

21. A method for improving service of Short Message Peer-to-Peer (SMPP) messages, the method comprising:
- selecting, by a network traffic management apparatus, a first one of a plurality of Short Message Service Center (SMSC) servers based on a load balancing decision in response to an external short messaging entity (ESME) SMPP request message received from a first one of a plurality of ESMEs;
- generating, by the network traffic management apparatus, a first sequence number for the ESME SMPP request message;
- storing, by the network traffic management apparatus, the first sequence number in a first entry of a mapping table as associated with a second sequence number included in the ESME SMPP request message and an indication of the selected first one of the plurality of SMSC servers;
- modifying, by the network traffic management apparatus, the ESME SMPP request message by replacing the second sequence number included in the ESME SMPP request message with the first sequence number; and
- sending, by the network traffic management apparatus, the modified ESME SMPP request message to the selected first one of the plurality of SMSC servers.

* * * * *